United States Patent
Hoffmeister et al.

(10) Patent No.: US 6,843,628 B1
(45) Date of Patent: Jan. 18, 2005

(54) FASTENING MEANS WITH MACHINE-READABLE INFORMATION STORAGE MEANS

(75) Inventors: Frank Hoffmeister, Ludenscheid (DE); Martin Kemper, Munster (DE)

(73) Assignee: Schrauben Betzer GmbH & Co. KG, Lundenscheid (DE)

( * ) Notice: Subject to any disclaimer, the term of this patent is extended or adjusted under 35 U.S.C. 154(b) by 0 days.

(21) Appl. No.: 09/958,381

(22) PCT Filed: Apr. 8, 2000

(86) PCT No.: PCT/DE00/01149
§ 371 (c)(1),
(2), (4) Date: Jan. 15, 2002

(87) PCT Pub. No.: WO00/63565
PCT Pub. Date: Oct. 26, 2000

(30) Foreign Application Priority Data

Apr. 16, 1999 (DE) .......................... 199 17 222

(51) Int. Cl.⁷ ............................................... F16B 31/02
(52) U.S. Cl. ......................... 411/14; 411/378; 81/467
(58) Field of Search ........................... 411/14, 13, 378, 411/439; 81/467, 469

(56) References Cited

U.S. PATENT DOCUMENTS

| 3,383,961 | A | * | 5/1968 | Dahl ........................... 81/469 |
| 4,294,122 | A | * | 10/1981 | Couchman ................... 411/14 |
| 5,256,020 | A | * | 10/1993 | Ikeda et al. ................ 411/368 |
| 5,437,525 | A | * | 8/1995 | Bras ............................ 411/14 |
| 5,479,799 | A | * | 1/1996 | Kilman et al. ................ 70/231 |
| 5,539,252 | A | * | 7/1996 | Brorby ....................... 257/678 |
| 5,634,755 | A | * | 6/1997 | Jones, Jr. .................... 411/383 |
| 6,204,771 | B1 | * | 3/2001 | Ceney ......................... 411/14 |
| 6,239,737 | B1 | * | 5/2001 | Black .......................... 342/51 |
| 6,390,205 | B2 | * | 5/2002 | Wallgren et al. ............. 81/467 |
| 6,533,494 | B1 | * | 3/2003 | Gordon ....................... 411/14 |
| 2003/0072634 | A1 | * | 4/2003 | Powell ....................... 411/358 |

FOREIGN PATENT DOCUMENTS

DE  33 27 964 A  2/1985

* cited by examiner

*Primary Examiner*—Debra S. Meislin
(74) *Attorney, Agent, or Firm*—Lahive & Cockfield, LLP.

(57) ABSTRACT

The invention relates to a fixing device, such as a screw (1) a plain washer, a nut or a rivet, with an information memory that can be read from the exterior. The information memory (4) is machine readable. According to the invention, the information memory contains optically readable information.

10 Claims, 1 Drawing Sheet

FASTENING MEANS WITH MACHINE-READABLE INFORMATION STORAGE MEANS

BACKGROUND OF THE INVENTION

The invention relates to a fastening means, a device for mounting such a fastening means, and a device for reading information from such fastening means.

Examples of fastening means in the form of bolts are disclosed in DE 198 28 700 A1. In these fastening means the information storage means are located so as to be protected: either surrounded on all sides by the bolt material or embedded in a supplementary plastic material, and situated additionally as required in a drilled hole running deeply into the bolt. Such fastening means require relatively expensive read/write devices through which individual data for each bolt may be read into the information storage means, for example such characteristics as the pretensioning force for the bolt in the bolt connection created.

The fastening means permit documentation of the bolt connections created and relate especially to high-value and thus expensive bolts such as those used, for example, in the aerospace industry. An additional aspect of these is the fact that any defective bolt connection is merely documented, and not prevented from occurring in the first place.

Fastening means, for example, in the form of bolts containing alphanumeric information which has been impressed or cast-en-bloc into the bolt head—for example containing information such as the bolt strength; however such approaches are not, due to the high molding costs, intended to provide more individualized information such as identification of the bolt type as determined by its dimensions and thread form. Such fastening means are relatively inexpensive to produce.

SUMMARY OF THE INVENTION

The object of the invention is to improve fastening means so as to provide these as inexpensively as possible with more individualized features based on their specific use, to permit the most complete documentation possible, and if possible support manipulation in an inexpensive, automatic, and the most defect-free manner possible.

In other words, the invention proposes providing an optical information storage means. Such information storage means may, for example, contain a barcode medium. Unlike so-called "one-dimensional" barcodes which display the information on one line, i.e., arranged sequentially in one dimension, two-dimensional 2-D barcodes may contain the information in redundant form and be readable from different read angles or directions; or multilayer, three-dimensional 3-D barcodes are possible which contain a large amount of information in the smallest possible area.

A surprising concept inherent in the invention is the fact that information does not need to be in permanently readable form, a form well known in the comparatively expensive fastening means according to the species with information attached in a protected manner, or in the comparatively inexpensive fastening means not according to the species containing impressed information. Rather, the goal of the invention is to facilitate the automatic sorting and utilization of multiple, outwardly similar but actually differing fastening means by having these essentially individually identified.

For example, bolts with the same width across flats, shank length, and shank strength but having differing thread lengths may be identified and differentiated by these barcodes. This identification process is comparatively inexpensive since the fastening means may be simply individualized by type rather than separately piece-by-piece, thus enabling the use of barcode media pre-produced in large production runs.

Manipulation tools, for example, a motor-driven wrench, may include a reader, which has been set to match the specific identification of the bolt. This ensures that only one specified type of bolt may be handled until the wrench is reset for another type of bolt. Resetting may be performed by a process control system, occurring as needed from one bolt to the next, with the result that when handling bolts of the same width across flats with the same wrench, different bolt types may be manipulated sequentially, for example, multiple bolts of differing lengths when attaching components in the dashboard area of a motor vehicle.

Documentation of the tightening torques of the bolt connections may also be performed by the process control system—with the result that, along with the assurance that only the correct bolt type has been installed, a high level of protection against defects is achieved, while the matching process for the use of the specific correct bolt type allows for additional, documentable information as well.

After proper assembly, the information storage means may become unreadable, for example, from weathering, scratching, or having been painted over.

Providing fastening means with an information storage means designed as a hologram, the approach being used to enhance protection against falsification, is technically relatively complex and expensive, while such protection is also achieved using the technically more sophisticated 2-D and especially 3-D barcodes. Specifically, the information storage means may contain cryptographically encoded information so as to allow the correct information to be read out of the information storage means only when matched to that of the intended readers. This feature also makes production of the fastening means more falsification-proof, thereby impeding or eliminating the use of low-quality counterfeit copies of the fastening means in connection with safety-relevant components.

Depending on the intended use of the fastening means, another type of individualization may be provided which, while more expensive by comparison with optical information storage means, is more suited to the specific demands of safety and documentability, and is thus reasonably priced for the specific use:

When barcode media are used as information storage means, a coat of paint covering the fastening means, for example, in the body of vehicles or aircraft, may impede or completely prevent a readout from this information storage means; however, when microchips are used as information storage means, needle-shaped electrodes, for example, may be employed to contact the chips, the electrodes penetrating the paint layer thereby allowing the information to be read out. This approach permits subsequent inspections of the installed fastening means.

A special provision in connection with the use of such microchips is to employ a chip with its own separate processor, thereby allowing especially complex encoding methods to be employed for the data contained in the information storage means. Given suitable dimensions for both the fastening means and the power storage unit of the microchip, the power storage unit may also be located in the fastening means. When a battery is employed in the fastening means as the power storage unit, long-term usability may be ensured by providing an activation circuit which is activated by the read or write device so that power is supplied to the microchip only when the microchip is accessed to transfer data.

Another approach is to make the microchip connectable to a power source through contacts on the surface of the fastening means, through capacitive coupling to generate a current in the microchip, or by other similar methods, the power source being located outside the fastening means, for example, in a tool or reader.

The information storage means may be advantageously designed not only as a device to be read from, but also as a read/write memory to which information may be written. With this design, not only may plant-specific information be stored in the fastening means when they are produced, but the fastening means may also be provided with information at a later date to facilitate an uninterrupted tracking process; for example, when, where, and by what method they were installed, and if required, in which workpieces.

Additionally, information about the material of the workpieces assembled with the fastening means may then facilitate recycling by grade/type during the disassembly process since the workpieces themselves will not have to be provided with machine-readable material codes but will, for example, already have the fastening means equipped with the information storage means.

The information storage means may be attached or inserted with adhesive and affixed as permanently as possible in the fastening means in a form-locked or friction-locked manner by crimping, riveting, embedding, clamping, slipping or rolling on, or other means, the method of attachment being selected as appropriate to the dimensions and characteristics of the fastening means, bolt installation tool, and information storage means.

As an alternative to those information storage means which consist of an add-on component in or on the fastening means, an information storage means inherent in the material may be provided, i.e., one created by the material of the fastening means itself: for example, a hard-magnetic section of the fastening means which acts as the information storage means to record magnetic information. The safety of the information thus stored against undesired deterioration or deletion is surprisingly good in such hard-magnetic regions.

Such material-inherent information storage means are especially useful where, as was explained using the example of barcodes, the information may be exposed to weathering after the fastening means have been installed. Specifically, this allows the identification to be invisible, thus helping to thwart counterfeiting and also facilitate later repeated readability, for example, during final production inspection despite dirt or paint. While the storage density is less when compared to optical or electronic information storage means, it is nevertheless often sufficient for simple individualization by type, for example.

Information may advantageously be stored in the information storage means which has been specified by the manufacturer of the fastening means and which relates, for example, to the manufacturer itself, the type of material used, the batch of the raw material or even the time or shift at which the fastening means were produced. Specifically, optical storage means such as barcodes or holograms may be produced by the manufacturer of the fastening means to provide this information.

If such identifications are automatically detected when the fastening means are installed, for example, by a reader located in a wrench, uninterrupted tracking becomes possible. In the event of recalls, for example in the automobile industry, targeted notifications may be sent to those vehicle owners in whose vehicles the nonconforming fastening means have been installed.

In addition to the first information storage means, a second, different information storage means may be provided. These two information storage means may differ in their information and/or in their physical characteristics. For example, the first information storage means may be an inexpensive mass-produced item such as a stick-on barcode label, while the second information storage means is one capable of being written to by the manufacturer of the fastening means, for example, a magnetic region of a metallic bolt which contains the batch number, production date, or virtually nonfalsifiable manufacturer's code.

In this way, it is even possible to achieve a piece-by-piece, separate individualization of each fastening means without significantly reducing the production rate as the fastening means are fabricated. The majority of the information is thus contained on the first information storage means, while the second information storage means need only contain the desired supplemental data. The use of a second information storage means additionally permits accommodation of information at two separate locations in the fastening means so that, for example, the first information storage means is optimally accessible when the fastening means are installed, for example, on the head of the bolt, whereas the second information storage means may be optimally accessible for later checks/inspection or inputting additional data at a later time, for example, on the end of the shank of the same bolt, for example, to document routine maintenance.

In addition, the information storage means can store information relating to the manipulation of the fastening means, information which can also be stored by the manufacturer of the fastening means. This may relate, for example, to specific strength parameters of the fastening means, thereby specifying or restricting their intended use. Additionally, specified tightening torques for the fastening means, or their allocation to specific workpieces or materials, may be stored in the information storage means.

Special provision may be advantageously made to allow interaction with an appropriately designed tool so as to have the mounting forces to be applied automatically controlled by the fastening means; for example, provision may be made in a wrench to have the tightening torques automatically controlled by the fastening means: to permit documentation of correct settings, the wrench already contains an electronic evaluation device to monitor the applied tightening torque. Based on the parameter specified by the bolt for the required tightening torque, the wrench may be controlled to automatically switch off when this torque stored in the bolt has been reached.

On the other hand, if an error is detected when the information is compared between the wrench and the fastening means, for example, when workpiece or material parameters are compared, the wrench may be locked such that the incorrect fastening means cannot be installed at this location.

The above relates not only to power wrenches. There are wrenches in practical use which are both hand-held and hand-operated, and which evaluate the tightening torque electronically. The momentary torque is shown on an LCD display, and an acoustic signal sounds when the desired tightening torque has been reached. The electrical power supply incorporated into these wrenches may be utilized for reading from or writing to the information storage means in a bolt.

In addition, information may be stored in the information storage device of the fastening means indicating, for example, whether a two-step bolt insertion procedure should be followed and what tightening torques should be used in this two-step bolt-tightening process. This feature allows for especially simple operation of the wrench even by untrained personnel since different torques applicable to a variety of fastening means may be adhered to reliably without the requirement of setting or resetting the wrench, except possibly in cases where the actual wrench tool must be switched, for example, a different socket.

A tool may be specifically configured for a workplace by equipping the tool itself with an information storage means containing information on the workpieces or materials to be attached with the wrench. Matching the corresponding information between fastening means and wrench prevents the fastening means from being used at the wrong location. This feature may be particularly advantageous for subsequent, completely automated recycling in which the tools for disassembly seek out those fastening means with the matching identification in order to dismantle the corresponding workpieces of a larger subassembly by uniform grade and type. For example, workpiece identifications may be provided such as "bumper" or "fender," or the relevant material identifications may be provided such as "PE," "PP," or "PVC" for plastics, and "St," "Mg," or "Al" for metal components.

With writable information storage means, it is advantageous to provide protection against falsification and manipulation by preventing new information entered in the information storage means from obscuring or replacing old information. In other words, no memory locations already used must be written to; rather, each new entry of information into the information storage means must, for reasons of safety or reliability, be permitted only in the remaining available memory locations.

Where relevant data are already being acquired during installation of the fastening means, for example, during the bolt insertion process, these may be displayed directly on the fastening means, thereby permitting the assembly process to be monitored even without electronic readers. For example, it is possible to locate a microchip on or in a bolt, with the microchip being equipped, for example, with an LED which is activated by an activation circuit when the specified tightening torque has been reached, for example. After the tool has been removed, it is then possible to check the procedure optically. To supply power to such a display, the fastening means may contain its own separate power storage unit; however, there may also be a power converter for supplying power from an external source, for example, in the form of a photocell such that when the fastening means is illuminated, the photocell generates an operating voltage for the LED, the LED lights up if the correct bolt connection has been made, and the activation circuit "disconnects" the LED.

It is possible to employ multicolored LEDs, for example, commercially available, alternatively red or green LEDs. Here the basic functionality of the display is always detectable when the LED lights up, for example, before the fastening means is used or during a subsequent inspection. In addition, differentiated information is generated by the color as to whether or not, for example, the specified tightening torque for the bolt connection has been achieved since the activation circuit switches between the appropriate contacts which determine the color only when this torque has been reached.

In order to inexpensively retrofit existing tools such as wrenches, an adapter may be provided which is inserted between the drive shaft of the wrench and the socket or similar wrench tool. This adapter may have a fixed external housing component as well as the internal extension of the wrench drive shaft.

From this adapter which creates the signal connection to the information storage means, signals or data may be transmitted to an electronic processing unit which is accommodated either in the adapter itself or is attached as an accessory to the wrench housing, or may be accommodated in a master electronic evaluation unit. This electronic processing unit is connected to a wire-connected or wireless data line in the wrench which is already incorporated into the wrench to record the bolt connections which have been performed.

BRIEF OF DESCRIPTION OF THE DRAWINGS

Embodiments of the invention are explained in more detail based on the following drawings.

DESCRIPTION OF ILLUSTRATED EMBODIMENT

Figure 1:
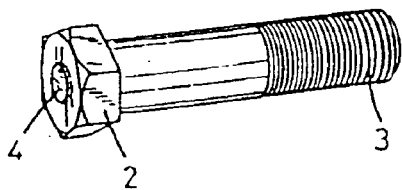
FIGS. 1 and 2 show various fastening means.

FIG. 1 shows a fastening means 1 in the form of a bolt which is representative of fastening means of various types such as bolts, nuts, rivets, pressed parts, or the like. The bolt has a hexagonal bolt head 2 and threaded shank 3. Located on bolt head 2 is an information storage means, shown only schematically, for example, a hard-magnetic region, a barcode medium or microchip, or even a microchip with its own processor which may include its own power storage unit, also accommodated in bolt head 2.

Figure 2:
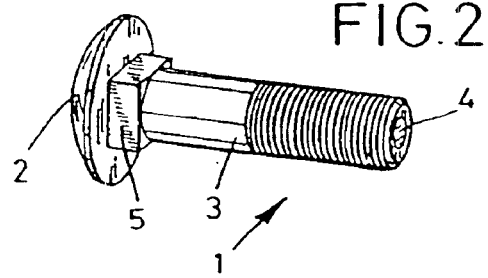

FIG. 2 shows a bolt 1 in which the bolt head 2 is not designed for manipulation by a tool. Instead, below the bolt head 2, the bolt has a locking element 5 with which it may be inserted in a secured or form-locked manner into, for example, a sheet metal plate. This bolt 1 is actually fastened from the shank end.

This bolt too may include an information storage means in bolt head 2. The design of the embodiment shown in FIG. 2, however, is such that this bolt will not remain accessible from bolt head 2 after the larger subassembly is installed. For this reason, the information storage means 4 is provided at the end of the bolt shank 3.

Depending on the manner in which this shank end projects from the subsequently attached nut, it is a simple matter to provide a blind hole in this shank end to accommodate information storage means 4, without jeopardizing the quality of the bolt connection. Alternatively, such bolt connections may incorporate information storage means 4 not in the bolt itself but in the attached nut. This approach ensures that the bolt cross-section does not have to be weakened by the provision of a blind hole.

Figure 3:
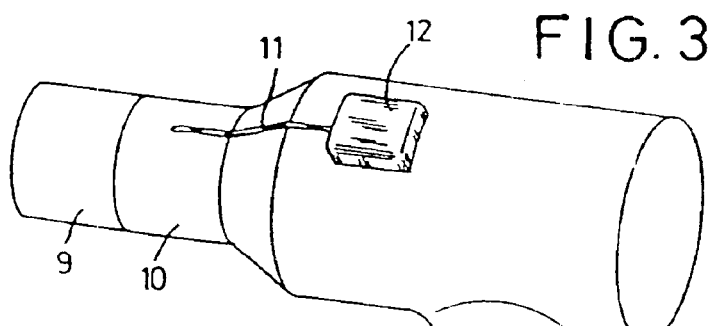
FIG. 3 shows a power wrench.

FIG. 3 shows a bolt-mounting tool, a so-called "wrench" 6. Wrench 6 is motorized for industrial use. Regardless of whether it is pneumatically or electrically driven, it thus incorporates a sensor to measure the tightening torque applied to the bolt so that the bolt connections may be recorded and documented. In the embodiment shown, the wrench includes a connecting line 7 for compressed air or electrical current to supply power to the wrench motor—however, according to the invention, non-motorized wrenches may also be used. A second data cable 8 is provided which, unlike the example shown, may be located in a sleeve which encloses both data cable 8 and connecting line 7.

Wrench 6 is designed for installing hexagonal head bolts and is thus equipped with a socket 9. Socket 9 is not attached directly in the usual fashion to the usually square-type shaft of wrench 6 but is located on an adapter 10 which is in turn fastened to wrench 6, thus extending its shaft.

In addition, adapter 10 incorporates read/write devices to access information storage means 4 of bolts 1. A transmission cable 11 runs from adapter 10 to an electronic circuit 12 which in turn is connected to the electronics of wrench 6 and thus data cable 8.

Data read from information storage means 4 of bolt 1 may thus be utilized via adapter 10 and electronic circuit 12, as well as data cable 8 in the familiar fashion to record and document the bolt connections. Additionally, wrench 6 may be directly controlled by bolt 1, for example, so as to switch off wrench 6 as soon as wrench 6 has applied the required tightening torque stored in information storage means 4 of bolt 1.

Conversely, information may also be written from the wrench to information storage means 4 of bolt 1, for example, the driving torque actually applied and information identifying the wrench, workplace, date and time, etc.

Figure 4:
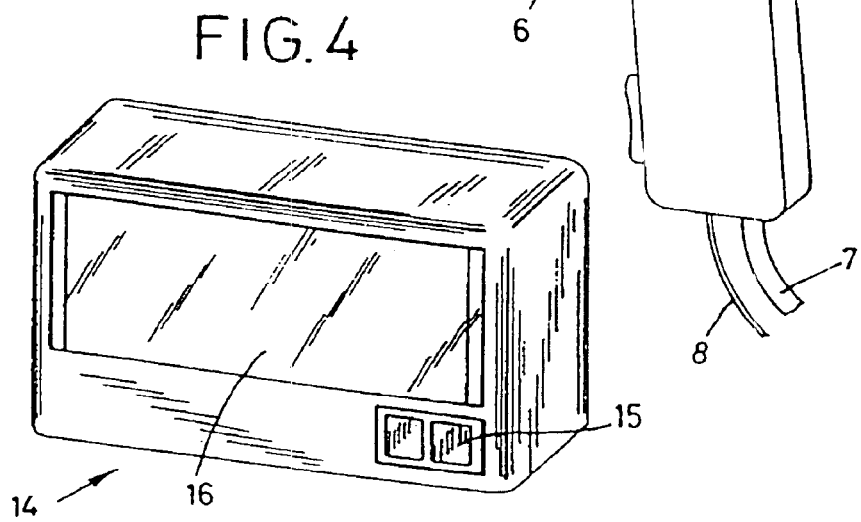
FIG. 4 shows a reader with optical display to show information which has been read from the information storage means.

FIG. 4 shows a handheld, portable reader 14 which has on its front side an on/off switch 15 and a display field 16. Reader 14 may be used to inspect bolts 1 by reading information from the information storage means 4 of the bolts. Specifically, this feature permits already installed bolt connections to undergo a quality-control inspection, or in the event of customer complaints, a determination can be made as to whether the correct bolt type is present, or—assuming the information storage means are writable memories and contain such assembly data—a determination can be made as to whether assembly has been performed correctly.

Another feature which may be added to this embodiment is to provide the reader with an input capability for certain parameters. In this case, for example, the identification number of a given bolt type can be entered, for example, and the corresponding bolt or number of these bolts may be searched. This feature may be used to differentiate between bolts of the same appearance, when these are not yet installed or have been removed. In the case of installed bolts, it may be utilized to differentiate between bolts of widely differing types in which the visible portion (for example the head) has the same appearance, or to locate bolts which come from the wrong lot, or for which the specified maintenance or inspection period has been exceeded and which now must be inspected, for example, to verify their interference fit for example. With unsorted bolts, this feature may be used to configure the reader to assist in searching for or sorting the bolts.

The information storage means 4 in the embodiments shown is a transponder, used as an example. According to the invention, transponders are especially advantageously suited as information storage means for bolts: unlike microchips, they do not require their own separate power source. As a result, there is the assurance that the information will remain intact and easily readable in the information storage means over a long period of time. In addition, the dimensions of the transponders are very small. Readability remains essentially unimpaired when the bolts are painted over or become contaminated, and unlike simple readable information storage means, write/read transponders may be employed to write data to the transponder in the manner described, with the result that more than just information from the bolt manufacturer may be stored in the bolt.

What is claimed is:

1. A fastener comprising:

an externally readable information storage element, the information storage element being configured to be machine-readable and containing optically readable information;

an optical display element in a region which remains visible after attachment; and an activation circuit which activates the display element upon attaining specified parameters;

wherein the information storage element comprises at least one of a two-dimensional and a three-dimensional barcode.

2. The fastener according to claim 1, wherein when the information storage element is a three-dimensional barcode, the information storage element comprises a hologram.

3. The fastener according to claim 1, further comprising multiple different information storage elements.

4. The fastener according to claim 3, wherein at least one of the multiple information storage elements is read-only while a second of the information storage means is both readable and writable.

5. The fastener according to claim 1, further comprising a device for mounting the fastener, the device having a reader to record information contained in the information storage element.

6. The fastener according to claim 5, further comprising an adapter which is connectable at one end to a fastening tool and at the other end to a manipulation element to manipulate the fastener, the adapter having at an opposite end at least one of the group of a read device and a read/write device enabling the transmission of data between the information storage element of the fastener and the adapter.

7. The fastener according to claim 1, further comprising a device for reading information from the information storage element, the device having connecting means to transmit data to a disassembly device, a readout device being designed to transmit information on the position and type of the fastener to a disassembly device.

8. The fastener according to claim 5, further comprising an associated electronic circuit which, by incorporating said information, controls a specified tightening torque of said fastener.

9. The fastener according to claim 6, wherein said adapter is connectable at said other end to a manipulation element in the form of a socket.

10. The fastener according to claim 6, further comprising an electronic evaluation unit connectable to said adapter via a data line.

\* \* \* \* \*